Jan. 21, 1930.  P. D'H. DRESSLER  1,744,453
KILN HEATING MEANS
Filed Aug. 5, 1924
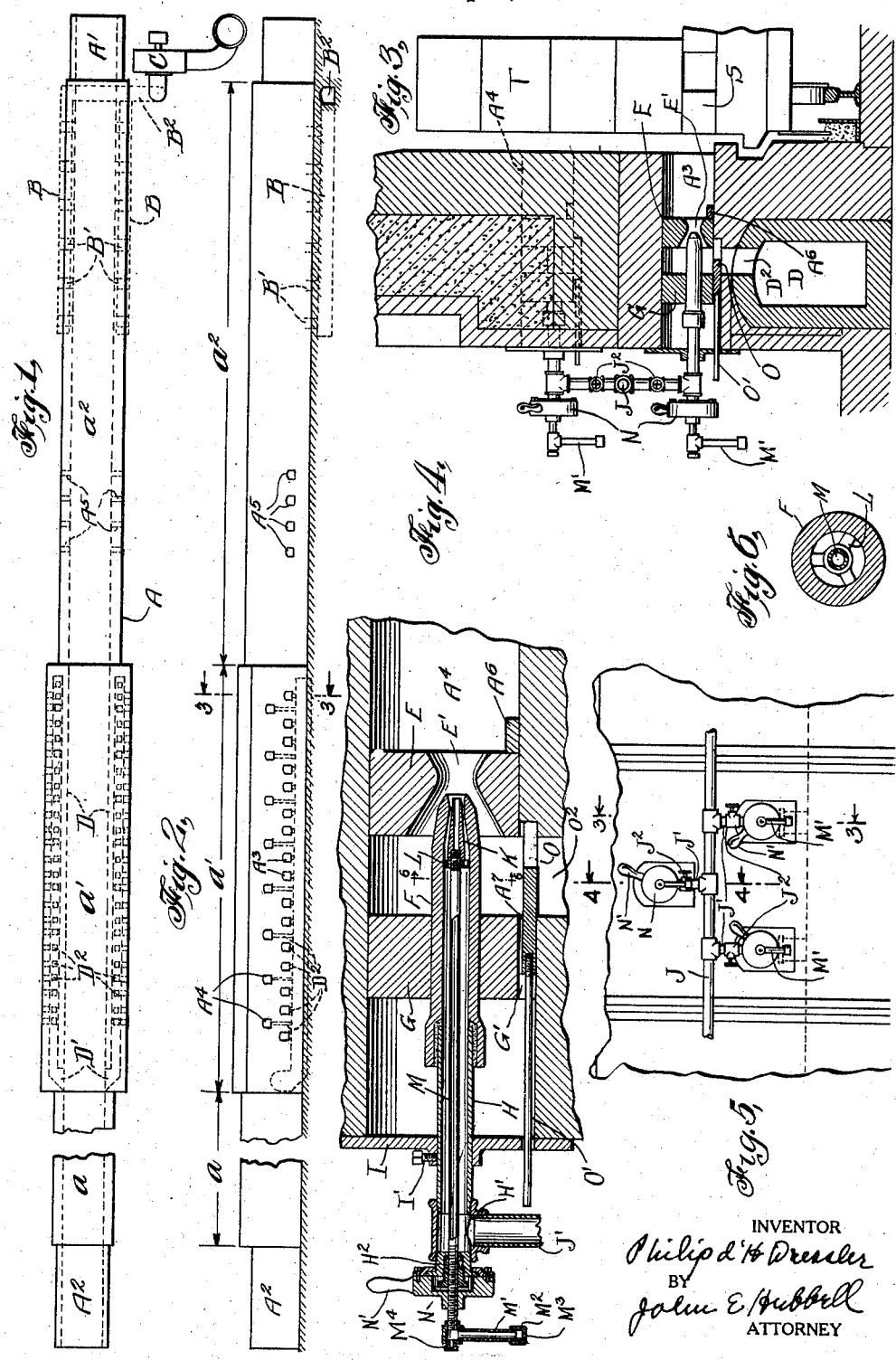
INVENTOR
Philip d'H Dressler
BY
John E. Hubbell
ATTORNEY Patented Jan. 21, 1930

1,744,453

UNITED STATES PATENT OFFICE

PHILIP D'HUC DRESSLER, OF CLEVELAND, OHIO, ASSIGNOR TO AMERICAN DRESSLER TUNNEL KILNS, INC., OF CLEVELAND, OHIO, A CORPORATION OF NEW YORK

KILN-HEATING MEANS

Application filed August 5, 1924. Serial No. 730,179.

The general object of my present invention is to provide improved heating means for kilns, and more specifically, the object of the present invention is to provide improved means for heating a direct fired continuous tunnel kiln by the combustion of fluid fuel and air for combustion drawn from the cooling zone of the kiln and supplied to the fuel burners at a relatively high temperature.

The various features of novelty which characterize my invention are pointed out with particularity in the claims annexed to and forming a part of this specification; but for a better understanding of the invention, its advantages, and specific objects attained with its use, reference should be had to the accompanying drawings and descriptive matter in which I have illustrated and described a preferred embodiment of my invention.

Of the drawings:

Fig. 1 is a diagrammatical view of a tunnel kiln;

Fig. 2 is a diagrammatical side elevation of the kiln shown in Fig. 1;

Fig. 3 is a partial section on the line 3—3 of Fig. 2;

Fig. 4 is a partial section on the line 4—4 of Fig. 5;

Fig. 5 is a partial side elevation of the kiln taken on a much larger scale than Fig. 2; and Fig. 6 is a section on the line 6—6 of Fig. 4.

In the drawings A represents the kiln, and A' and A² the entrance and exit ends, respectively, thereof. The kiln as shown, comprises a cooling zone section $a$, a furnace zone section $a'$, and a preheating zone section $a^2$. The heating gases are withdrawn from the kiln by provisions which, in the particular construction illustrated, comprise ports B' opening from the kiln chamber proper at distributed points along the length of the entrance end of the preheating zone $a^2$, and discharging into flues B connected to a transverse flue B² running to a draft creating device shown as an exhaust fan C.

The kiln heating provisions comprise a plurality of burner chambers A³ and A⁴ formed in the side walls of the kiln chamber and distributed along the length of the zone $a'$. As shown, there are a multiplicity of burner chambers A³ which may be arranged one every three feet or so along the length of the furnace zone $a'$ of the kiln, and located at or about the level of the top of the goods supporting platforms of the kiln cars S. The burner chambers A⁴ are advantageously fewer in number and spaced more widely apart than the burner chambers A³ and are located at a higher level. The chambers A⁴ may well be about midway of the top and bottom ends of the mass of goods stacked on the cars S.

The various burner chambers A³ and A⁴ and associated parts may be and are shown as all alike. Each burner chamber is in the form of a horizontal extending channel in the masonry side wall portion of the kiln chamber. Adjacent the inner end of the burner chamber, air for combustion is supplied to each burner chamber from a flue D through a corresponding port D². Mounted in each burner chamber at some distance out from the kiln chamber proper but at the inner side of the corresponding port D² is a block of fire brick or suitable refractory material provided with a suitably shaped central orifice E' the ends of which are outwardly flared. The block E may be simply pushed into place against a shoulder A⁶ provided for the purpose at the bottom wall of the burner chamber at the inner side of block E. At the outer side of the corresponding port D² another block G is mounted in the burner chamber. This block may be loosely mounted in the burner chamber in the same manner as is the block E.

Each block G is provided with a central aperture in which is mounted a tubular burner nozzle part F of highly refractory material such as carborundum or heat resisting metal. At its outer end the nozzle part F is connected to a metal pipe H which extends through the cover plate I closing the outer end of the burner chamber and exteriorly of the latter is connected to an individual branch J' of the fuel supply piping J. The nozzle part F may axially be adjusted toward and away from the orifice E' and secured in any desired adjustment by a set screw I' carried by the cover plate I.

Ordinarily and preferably the fuel supplied by piping J is "clean producer gas." Mounted in the nozzle part F is an axially adjustable nozzle part K made of highly refractory material as carborundum or heat resisting metal which is secured at its outer end to a metal tube M axially disposed in the nozzle part F and pipe H. The tube M and nozzle part K are smaller in internal diameter than the internal diameters of the nozzle part F and tube H. Advantageously as shown, the inner end of the tube M passes through a spider like guide L which assists in holding the tube M and the refractory extension K thereof axially centered in the part F. The outer end of the T fitting H' by which the tube H is connected to the gas supply pipe J' is closed by a bushing H² which is provided with a stuffing box for the tube M and forms a bearing for an angularly adjustable member N provided with a threaded orifice through which the threaded outer portion of the tube M passes. The member N is provided with a handle N' by which the member may be rotated to thereby axially adjust the tube M and the extension K thereof. A branch pipe M' transverse to the pipe M is secured to the outer end of the latter by a T fitting and forms a handle by which the tube M may be held against rotation when the member N is rotated to axially adjust the tube. The outer end of the pipe M' may be closed entirely but, as shown, is provided with a cap M² through a port M³ in which a small quantity of atmospheric air, depending in amount on the size of the port M³ may be drawn into the burner. The T fitting connecting the pipes M and M' is advantageously provided at its outer end with a port or peep hole M⁴ permitting visual inspection of the burner operation through the bore of the tube M. The two flues D, one at each side of the kiln chamber, open to the interior of the latter as indicated at D', adjacent the junction between the cooling zone a and furnace zone a' of the kiln. The passage of air through each port D² may be regulated by a corresponding damper O mounted on the bottom wall of the corresponding burner chamber, and provided with an operating handle O' extending along the bottom of the burner chamber through a passage G' formed in the bottom of the block G and through an opening formed in the cover plate 1.

In the preferred contemplated use of the invention, fuel gas is discharged through each burner nozzle part F with a sufficiently high velocity to draw with it air supplied through the corresponding port D² in amount sufficient to insure the proper combustion of the fuel. By a suitable axial adjustment of the nozzle part K in the nozzle part F of each burner chamber and the use of an adequately high supply pressure in the piping J, the fuel jet velocity may be regulated to secure the proper air moving or jet ejector effect regardless of the rate at which the fuel gas is supplied to the burner. The rate at which each gas is supplied to each burner may be individually regulated by the adjustment of a valve J² in the corresponding branch supply pipe J' if such individual regulation is necessary or desirable.

It will be apparent to those skilled in the art that the invention is characterized by the simplicity and effectiveness of the provisions made for supplying preheated air and fuel gas to a multiplicity of burner chambers which, because of their form, construction and relatively low cost, may be made as numerous as are required to insure a highly desirable distribution of the heating gases. An advantageous characteristic of the invention is the ability with it to properly distribute preheated air drawn from the cooling zone section of the kiln to the different burner chambers A³ and A⁴ without the use of a special exhaust fan or other air moving apparatus for the purpose. The burner constructions are such that the burner parts associated with any one burner chamber may be withdrawn and replaced for cleaning, inspection or repairs when necessary, without interrupting the operation of the other burners.

The apparatus illustrated was primarily devised for use with producer gas as the fuel. The volume of such a fuel gas is but little less than the volume of air required for its combustion, and the ejector action of the fuel supply provisions may be relied upon to draw into the burner chambers all of the air required for combustion. When a fuel gas of substantially higher B. t. u. value, as natural gas or town gas, is employed as the fuel, and the volume of air required for combustion is substantially larger than the volume of gas burned, it may be desirable to pre-mix with the gas supplied by the piping J a substantial portion of the air required for combustion, to thereby insure the desired distribution of the remaining air for combustion by the ejector action of the fuel supply nozzles. In this case, the average degree of preheat imparted to the air supporting combustion is reduced, but an incidental advantage of this is a reduced tendency to carbon deposits in the burner nozzle passages.

In some cases additional heat may be supplied to the kiln chamber in the preheating zone by means of burner chambers A⁵ and burner provisions mounted therein, but as the air for combustion supplied to these burner chambers need not be preheated but may be drawn from the atmosphere, and as the burner provisions in these chambers may be of known form, I have not thought it necessary to illustrate their construction herein.

While in accordance with the provisions of the statutes I have illustrated and described the best form of my invention now known to me, it will be apparent to those skilled in the art that changes may be made in the form of the apparatus illustrated therein without departing from the spirit of my invention as set forth in my claims and that certain features of my invention may sometimes be advantageously employed without a corresponding use of other features.

Having now described my invention what I claim as new and desire to secure by Letters Patent is:

1. An open fired tunnel kiln having side walls enclosing an elongated kiln chamber, a series of separate burner chambers in one of its side walls, a conduit connecting said kiln chamber with said burner chambers for passing preheated air to the latter and fluid fuel supply means associated with each burner chamber and adapted to operate as a jet ejector to draw air for combustion from said kiln chamber through said conduit at a rate substantially proportional to the rate at which fluid fuel is supplied by said means.

2. An open fired tunnel kiln having side walls enclosing an elongated kiln chamber, a series of separate burner chambers in each of its side walls, a conduit in each side wall connecting said burner chambers with a portion of the kiln chamber longitudinally displaced from said burner chambers and fluid fuel supply means associated with each burner chamber and adapted to operate as a jet ejector to draw air for combustion from said kiln chamber through the corresponding conduit at a rate substantially proportional to the rate at which fluid fuel is supplied by said means.

3. An open fired tunnel kiln having side walls enclosing an elongated kiln chamber, a series of separate burner chambers in each of its side walls, a conduit in each side wall connecting said burner chambers with a portion of the kiln chamber longitudinally displaced from said burner chambers, dampers regulating the distribution of air to the different burner chambers from said conduits, and fluid fuel supply means associated with each burner chamber and adapted to operate as a jet ejector to draw preheated air for combustion from said kiln chamber through the corresponding conduit at a rate substantially proportional to the rate at which fluid fuel is supplied by said means.

4. An open fired tunnel kiln having side walls enclosing an elongated kiln chamber, a series of separate burner chambers in each of its side walls, a conduit in each side wall connecting the burner chambers to the kiln chamber adjacent the hot end of the cooling zone of the kiln, and fluid fuel supply means associated with each burner chamber and adapted to operate as a jet ejector to draw air from said kiln chamber through the corresponding conduit and burner chamber at a rate substantially proportional to the rate at which fluid fuel is supplied by said means and discharge it into the kiln chamber.

5. In a tunnel kiln having a series of separate burner chambers in one of its side walls, the improvement which consists in a port connecting each of the burner chambers to the kiln chamber, an air supply conduit connecting said burner chambers and kiln chamber, a fuel supply nozzle discharging through each of said ports, and means for throttling the discharge passage in each of said nozzles at the discharge end of the latter to thereby vary the discharge velocity relative to the quantity of fluid discharged.

6. In an open fired tunnel kiln having side walls enclosing an elongated kiln chamber, the improvement which consists in a series of burner chambers in one of said side walls, a refractory wall between each of said burner chambers and the kiln chamber formed with a port connecting said chambers, a preheated air supply conduit connecting said burner chambers to said kiln chamber, a fuel supply nozzle mounted in the outer wall of each of said burner chambers coaxial with the corresponding port, and provisions for variably restricting the discharge end of the passageway through each of said nozzles.

7. In an open fired tunnel kiln, the improvement which consists in a burner chamber formed in the side wall of the kiln chamber, a refractory wall between said chamber and the kiln chamber formed with a port connecting said chambers, an air supply conduit opening to the burner chamber, a fuel supply nozzle mounted in the outer wall of said burner chamber co-axial with said port and axially adjustable to vary the effective air discharge area of said port, and provisions for variably restricting the discharge end of the passage way through said nozzle.

8. The combination in an open fired tunnel kiln formed with a burner chamber in the side wall of the kiln chamber and extending transversely away from the latter, and formed with an air inlet port to said burner chamber, of a refractory block extending across the chamber between the air inlet port and the kiln chamber and formed with an orifice through which the burner chamber communicates with the kiln chamber, a second refractory block extending across the burner chamber at the outer side of said air inlet port and formed with an opening coaxial with said orifice, and a refractory fuel supply nozzle mounted in said opening.

9. The combination in an open fired tunnel kiln formed with a burner chamber in the side wall of the kiln chamber and extending transversely away from the latter, and formed with an air inlet port to said burner chamber, of a refractory block extending across the chamber between the air inlet port and the kiln chamber and formed with an orifice through which the burner chamber communicates with the kiln chamber, a second refractory block extending across the burner chamber at the outer side of said air inlet port and formed with an opening co-axial with said orifice, and a refractory fuel supply nozzle mounted in said opening, said blocks being insertable and removable through the outer end of said burner chamber.

10. The combination in an open fired tunnel kiln formed with a burner chamber in the side wall of the kiln chamber and extending transversely away from the latter, and with an air inlet port opening to said burner chamber through the floor of the latter, a refractory block extending across the chamber between the air inlet port and the kiln chamber and formed with an orifice through which the burner chamber communicates with the kiln chamber, a second refractory block extending across the burner chamber at the outer side of said air inlet port and formed with an opening co-axial with said orifice, a refractory fuel supply nozzle mounted in said opening, and a damper controlling said port resting on the floor of said burner chamber.

11. The combination in an open fired tunnel kiln formed with a burner chamber in the side wall of the kiln chamber and extending transversely away from the latter and communicating with the kiln chamber through a port and formed also with an air inlet port through said burner chamber, of a refractory wall across the burner chamber at the outer side of said inlet port and formed with an opening, a refractory fuel supply nozzle mounted in said opening and discharging through said port and a tubular obturator having a tip of refractory material mounted in said burner nozzle and adjustable to vary the fuel jet discharge velocity relative to the quantity of fuel discharge.

12. The combination in an open fired tunnel kiln formed with a burner chamber in the side wall of the kiln chamber and extending transversely away from the latter and communicating with the kiln chamber through a port and formed also with an air inlet port through said burner chamber, of a refractory wall across the burner chamber at the outer side of said inlet port and formed with an opening, a refractory fuel supply nozzle mounted in said opening and discharging through said port and a tubular obturator mounted in said burner nozzle and adjustable to vary the fuel jet discharge velocity relative to the quantity of fuel discharge, and provisions for supplying a limited amount of air to the interior of said obturator.

13. The combination in an open fired tunnel kiln formed with a burner chamber in the side wall of the kiln chamber and extending transversely away from the latter and communicating with the kiln chamber through a port and formed also with an air inlet port through said burner chamber, of a refractory wall across the burner chamber at the outer side of said inlet port and formed with an opening, a refractory fuel supply nozzle mounted in said opening and discharging through said port, and a tubular obturator having a tip of refractory material disposed in said burner nozzle and adjustable to vary the fuel jet discharge velocity relative to the quantity of fuel discharged, and forming a peep hole through which combustion conditions may be inspected.

14. The combination in an open fired tunnel kiln formed with a burner chamber in the side wall of the kiln chamber and extending transversely away from the latter, and formed also with an air inlet port opening to said burner chamber, of refractory walls extending across said burner chamber at the inner and outer sides of said port, the inner wall being formed with a burner orifice, and the wall at the outer side of the port being formed with an opening co-axial with said port, a refractory nozzle mounted at said opening and having its discharge end adjacent said port, metallic fuel supply piping connected to the outer end of said nozzle, a tubular obturator mounted in said nozzle and piping and comprising an outer metallic portion, and means connecting said outer portion and piping for effecting an axial adjustment of said obturator.

15. The combination in an open fired tunnel skin formed with a burner chamber in the side wall of the kiln chamber and extending transversely away from the latter, and formed also with an air inlet port opening to said burner chamber, of refractory walls extending across said burner chamber at the inner and outer sides of said port, the wall at the inner side of the port being formed with a burner orifice, and the wall at the outer side of the port being formed with an opening co-axial with said port, a refractory nozzle mounted at said opening and having its discharge end adjacent said port, metallic fuel supply piping connected to the outer end of said nozzle, an obturator mounted in said nozzle and piping and comprising an outer metallic portion extending through said piping, and a threaded connection between said outer portion and piping for effecting an axial adjustment of said obturator being provided with a transverse portion forming a handle for holding said portion against rotation as it is being axially adjusted.

16. The combination in an open fired tunnel kiln formed with a burner chamber in the side wall of the kiln chamber which extends transversely away from the latter, and formed also with an air supply port opening to said burner chamber, of burner provisions insertable in and removable from the burner chamber through the outer end of the latter comprising refractory blocks forming walls extending across the burner chamber at the inner and outer sides of said port with a burner orifice in the wall at the inner side of said port and a fuel supply nozzle mounted in and extending through the wall at the outer side of said port.

Signed at Cleveland in the county of Cuyahoga and State of Ohio this first day of August, A. D. 1924.

PHILIP D'HUC DRESSLER.